(No Model.)
H. McINTOSH.
WIRE STRETCHER.
No. 284,969. Patented Sept. 11, 1883.
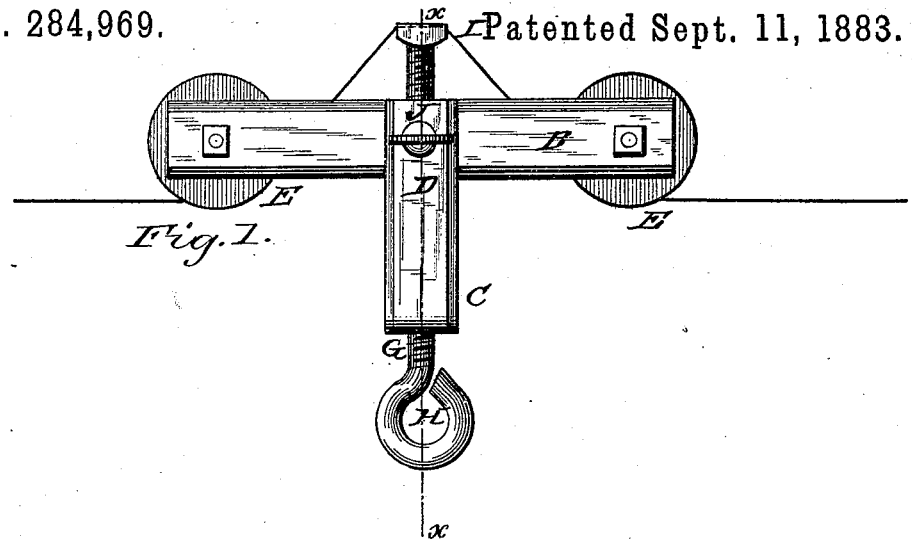
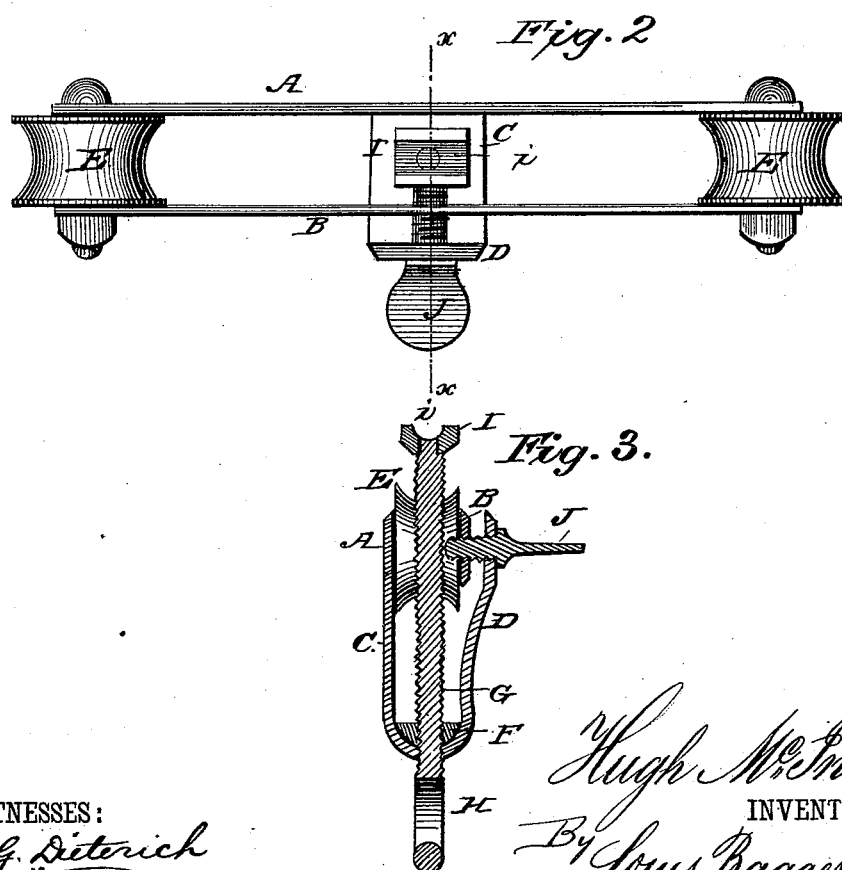
WITNESSES:
Fred. G. Dieterich
Arthur L. Morsell
Hugh McIntosh,
INVENTOR.
By Louis Bagger & Co.
ATTORNEYS.

UNITED STATES PATENT OFFICE.

HUGH McINTOSH, OF DECORAH, IOWA, ASSIGNOR OF ONE-HALF TO MONROE McINTOSH, OF SAME PLACE.

WIRE-STRETCHER.

SPECIFICATION forming part of Letters Patent No. 284,969, dated September 11, 1883.

Application filed May 15, 1883. (No model.)

*To all whom it may concern:*

Be it known that I, HUGH McINTOSH, a citizen of the United States, and a resident of Decorah, in the county of Winneshiek and State of Iowa, have invented certain new and useful Improvements in Wire-Stretchers; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved device for stretching the wire of wire fences, showing it in position upon the wire to be stretched or tightened. Fig. 2 is a top view of the same, and Fig. 3 is a cross-section through line $x$ $x$.

Similar letters of reference indicate corresponding parts in all the figures.

My invention has relation to that class of wire-stretchers which are placed and remain upon the strands in a wire fence for the purpose of taking up slack in the wires, as they become stretched and slackened in course of time; and it consists in the improved construction and combination of parts of the same, as hereinafter more fully described and claimed.

In the accompanying drawings, A and B are the two sides of the device, of which A has a downward-projecting arm, C, the lower end of which is bent or doubled to form the part D, the free or upper end of which projects up to the top of arm B. These parts A and B form bearings for grooved rollers E E, while the doubled lower part of arm C D is screw-threaded and provided with a nut, F, which forms a bearing for the screw G, the lower end of which is bent to form a loop or eye, H, through which a rod or lever may be inserted for turning the screw in operating the device. The upper end of the screw is tenoned to adapt it to fit the removable head I, which is grooved, as shown at $i$, to receive the wire. Inserted through the upper end of part D is a thumb-screw, J, the inner end of which may be screwed into a threaded hole in the middle part of arm B.

From the foregoing description, taken in connection with the drawings, the operation of this device will readily be understood. It is placed upon the wire by removing the thumb-screw J, and then slipping the wire in between the parts B and D, letting the rollers rest upon the wire. Screw G is then so adjusted as to bring the head I to bear against the under side of the wire, after which the screw is turned so as to work it up through the nut F, thereby drawing the wire taut between the rollers, as indicated in Fig. 1 of the drawings.

It will be seen that this device is exceedingly simple and inexpensive in its construction, and that it may be used for any kind of wire fence, plain or barbed, remaining upon the wires.

Having thus described my invention, I claim and desire to secure by Letters Patent of the United States—

The wire-stretcher herein shown and described, consisting of the frame-pieces A B, arm C, bent to form the part D, nut F, screw G, head I, thumb-screw J, and rollers E E, the whole constructed and combined to operate substantially in the manner and for the purpose herein shown and described.

In testimony that I claim the foregoing as my own I have hereunto affixed my signature in presence of two witnesses.

HUGH McINTOSH.

Witnesses:
AMOS J. McKAY,
J. W. MACKENSTADT.